United States Patent [19]

Hernandez

[11] 4,098,391
[45] Jul. 4, 1978

[54] ARTICLE ATTITUDE HANDLING APPARATUS

[76] Inventor: Jesus M. Hernandez, 135 Hughes Dr., Oxnard, Calif. 93030

[21] Appl. No.: 696,570

[22] Filed: Jun. 16, 1976

[51] Int. Cl.² ............................................. B65G 47/24
[52] U.S. Cl. .................................................... 198/417
[58] Field of Search .............. 198/373, 389, 390, 406, 198/416, 417; 214/1 Q, 1 R, 311; 221/156–159

[56] References Cited

U.S. PATENT DOCUMENTS

| | | | |
|---|---|---|---|
| 2,662,631 | 12/1953 | Kraus et al. | 198/417 X |
| 2,667,958 | 2/1954 | Malhiot | 198/417 X |
| 3,407,917 | 10/1968 | Locuwood | 221/158 X |
| 3,446,334 | 5/1969 | Donner | 198/417 |
| 3,598,222 | 8/1971 | Menacci | 198/417 |

Primary Examiner—Frank E. Werner
Attorney, Agent, or Firm—Henry M. Bissell

[57] ABSTRACT

A material handling apparatus including a conveyor line for articles such as cylindrical can containers is described. The articles are conveyed to an online guide framework having unique engaging rod positions, wherein the guide framework the articles are oriented in a different attitude for further conveyance from the outlet of the guide framework. The structure of the guide framework is such that articles from an upright attitude are reoriented to a horizontal attitude, and articles accidentally already in the horizontal attitude are not re-oriented by the guide framework but are conveyed therethrough to exit in the desired horizontal attitude.

7 Claims, 6 Drawing Figures

ARTICLE ATTITUDE HANDLING APPARATUS

BACKGROUND OF THE INVENTION

1. Field of the Invention

This invention relates to material handling conveying lines, and more particularly to can attitude re-orientation devices on the material handling conveying line.

2. Background of the Invention

Automatic canning operations have long employed the assembly line technique, wherein cans are conveyed along a conveyor belt or along a conveyor line in a continuous stream. The cans are filled, most often by automatic means at various stations along the line. At subsequent stations along the line, the can is sealed with a lid, frequently in a chamber having some vacuum so that the contents will be vacuum packed. The containers frequently are made of metal, but can be made of paper, paper treated with other substances such as wax or the like, plastic and similar type containing material.

After the container has been packed with ingredients, it is often desirable to affix to the container some kind of label. It is often desirable that the article, especially cylindrical articles, be turned onto its cylindrical side wall, and further conveyed possibly in a rolling motion. At another station along the cannery conveying line, a label is affixed to the side of the container. Frequently, the label may be a sheet of paper rolled onto the side wall of the cylindrical can, and affixed to the side with glue or other suitable means.

Moreover, it has been found easy to pack in large shipping crates and boxes cans from a conveyor line, where the cans are being conveyed to the crate in a horizontal position as where the can has been turned on its cylindrical side wall. Thus, it is often desired to change the orientation or attitude of the can from a vertical attitude to a horizontal attitude as the cans are conveyed in a continuous stream along a line in the cannery.

Simple devices and apparatuses for such cylindrical article re-orientation have been known in the past. For a representative example, note Van der Winden, U.S. Pat. No. 3,197,013. In such known devices, rods or conveyor side walls are configured in a channel to turn and to re-orient the can as it progresses along the line. In conventional channels, the rods or side walls are normally designed to have a close fit with the article passing therethrough being re-oriented. Oftentimes, one article in the line of articles becomes slightly disoriented relative to the channel and becomes stuck.

It is desired in many applications to have an article reorientation channel or framework so that slightly disoriented articles can pass therethrough yet exit therefrom in the desired attitude or orientation. It is also sought to obtain such an article re-orientation framework which is yet simpler, thus less expensive and more free from possibility of entanglement.

SUMMARY OF THE INVENTION

A conveyor guide framework is taught for conveying articles such as cylindrical cans along a conveyor line in a cannery. The guide framework consists of fundamentally two rods configured in a twisted shape, one rod engaging the bottom surface of the can while the second rod engages the side of the can relative to the center of gravity of the can when filled. The bottom surface engaging rod extends from a plane including the conveyor line, to a point vertically above the conveyor line and to one side of the guide framework. The second rod extends inwardly into the guide framework, and terminates in a plane of the conveyor moving the cans in the line.

In another aspect of the invention, additional rods may be supplied to also engage the side of the can, and to restrain the can within the confines of the conveyor line. In the preferred embodiment of the invention, a third rod is provided to engage the side of the can at the beginning of the framework, and to be part of the bottom load sustaining means as the can is moved along in the conveyor line. The second rod extending inwardly of the framework and the first rod extending from the bottom plane to a side of the conveyor channel are designed so that the articles accidentally in the horizontal attitude entering into the framework or channel will not be oriented again into a vertical attitude, but will be passed through the framework or channel so as to exit in a horizontal attitude without further re-orientation within the framework or channel.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENT

Figure 1:
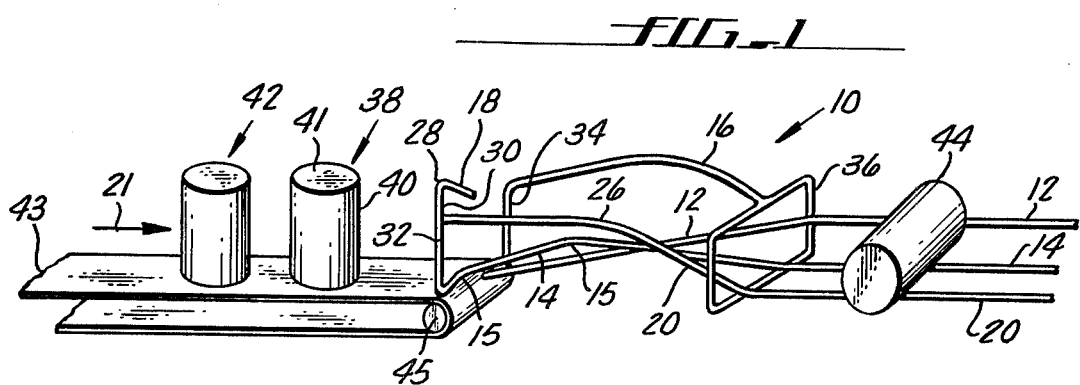
FIG. 1 is a perspective view of the preferred embodiment of the invention.
Figure 2:
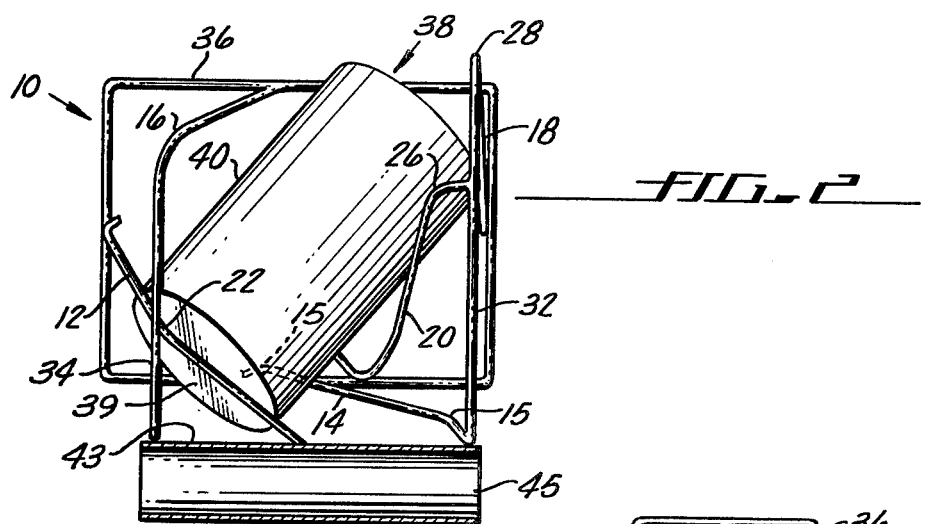
FIG. 2 is a side elevational view of the preferred embodiment, as seen along the direction of travel of articles in a conveyor line.
Figure 3:
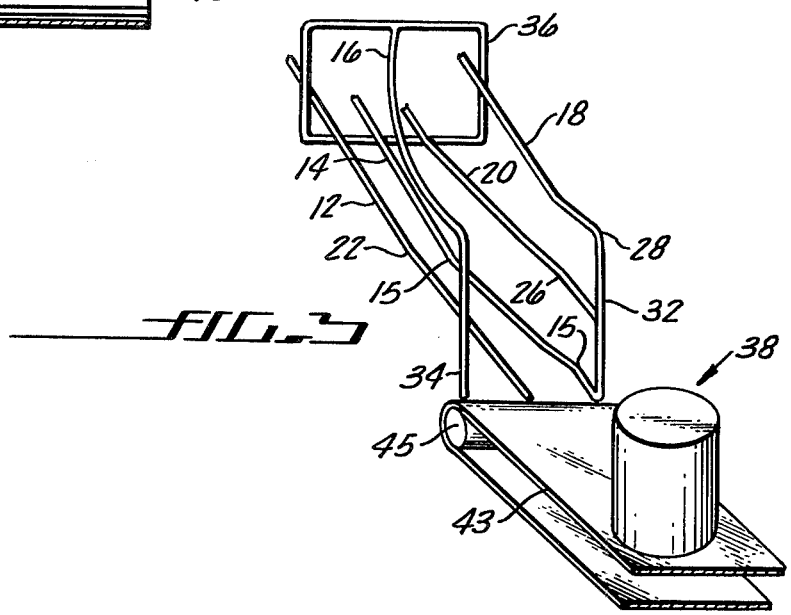
FIG. 3 is a perspective view of the channel or framework of the preferred embodiment of the invention, taken generally in the direction of travel of the articles in the conveyor line.
Figure 4:
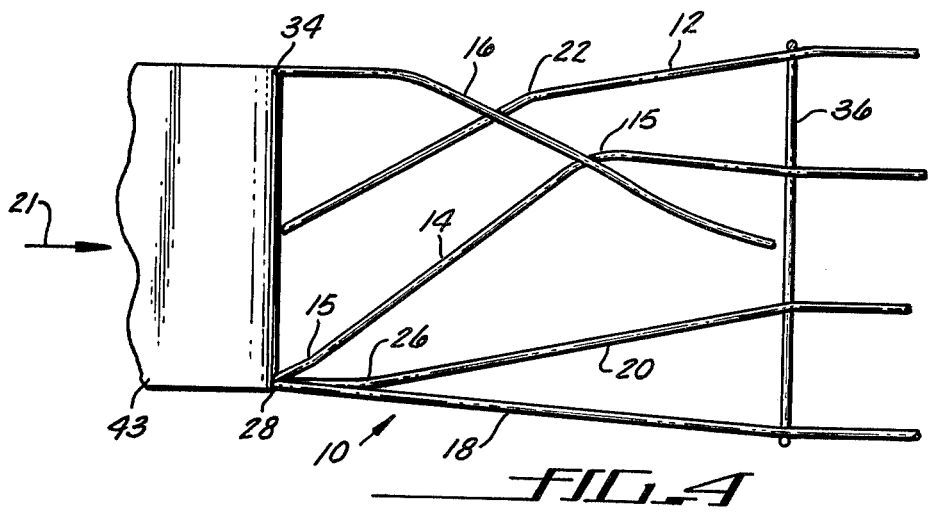
FIG. 4 is a top view of the channel or framework of the preferred embodiment of the invention.

Referring initially to FIGS. 1–4, a guide framework or channel 10 is shown comprising rods 12, 14, 16, 18 and 20. The rod 12 extends generally from the base of the framework in the direction of travel, as indicated by the arrow 21, to a side of the channel exit frame 36. The rod 12 extends through the exit frame 36 along the downstream side of the conveyor line, to constitute a side or guiding rail of the downstream portion of the conveyor line. The rod 12 may be viewed as beginning in a plane including posts 32, 34, which plane may be considered as the beginning of the guide framework 10.

Cans 38, 40, representative of a continuous stream of cans, are conveyed along conveyor belt 43, constituting part of the conveyor line. The conveyor belt 43 terminates about roller 45 approximately in the beginning plane of the guide framework 10. Before they enter the guide framework 10, the cans 38, 40 are in the upright position, having their bottom surface, such as bottom 39 of can 38, sitting on the conveyor belt 43. The cans have a cylindrical side wall, such as cylindrical side wall 40 of can 38. At previous stations along the conveyor line, the cans are filled and are sealed at the top surface with a top, such as top 41 of can 38.

In the channel or guide framework 10, rod 14 extends from the channel beginning plane at the bottom and at the side of the guide framework 10. The rod 14 continues through the exit frame 36 along the bottom of the conveyor line, and constitutes a load sustaining part of the conveyor line. Rod 14 has two bends 15 which extend inwardly in the channel or guide framework 10. The two bends 15 present a knee for engaging the can 38, as will be explained in more detail below.

Rod 16 extends from a side of the guide framework 10 in the beginning plane from post 34, to the top of exit frame 36. Rod 18 extends from the beginning plane at the opposite side of guide framework 10, from post 32 at the bend or knee 28. The rod 18 is shown partially cut-away in the views of FIGS. 1 and 2, but can be seen fully in the views of FIGS. 2 and 3. The rod 18 continues through its side of channel 10 through the exit frame 36, and constitutes a guide for the conveyor line portion beyond the exit frame 36. Rod 18 is partially removed from the view of FIG. 1, merely for the purpose of allowing FIG. 1 to more clearly exhibit the rods 12, 14 and 20.

Rod 20 extends from the post 32 in the beginning plane of the channel 10, and extends partially inwardly and to the bottom of the channel 10 through the exit frame 36. In that part of the conveyor line beyond the exit frame 36, the rod 20 constitutes one of the two, along with rod 14, load sustaining bottom rods of the conveyor line. Rod 20 contains a bend 26 within the channel 10.

In operation, the guide framework 10 works to re-orient the upright can, such as can 38 into a horizontal attitude, such as is can 44. The cans 38, 42 are moved along the conveyor line in the direction indicated by arrow 21 by movement of the conveyor belt 43. The can 38 is delivered to the beginning plane of the guide framework 10. As the can 38 passes through this beginning plane, the bottom 39 is moved on top of rod 12, which sustains momentarily the entire weight of can 38. As the can 38 progresses in the conveyor movement direction, rod 14 engages the cylindrical side wall 40 at a point below the center of gravity of the can 38. Because of the inward direction of the knee formed by the bends 15 in rod 14, can 38 has its lower portion urged to the left, as seen in the side elevational view of FIG. 2, while portions of the bottom 39 fall between the rods 12 and 14. Rod 20 also engages the cylindrical side wall 40, but at the upper portion thereof. Consequently, when the bottom 39 falls between the rods 12 and 14, the upper portion of the cylindrical side wall 40 is engaged by the rod 20. As the can 38 progresses through the framework 10, the cylindrical side wall 40 is gently allowed to slide down the rod 20 until the can 38 is in a horizontal attitude. Simultaneously, the bottom 39 is urged into a vertical attitude by its tracking along rod 12. Can 38 then progresses through the exit frame 36 in a horizontal attitude, as is can 44 in FIG. 1 of the drawings.

It is to be noted that there is no vertical limit on the size of the can entering the guide framework 10. Moreover, the guide framework 10 may have its posts 32, 34 substantially widened, so as to accommodate and receive varying sizes of articles, such as cans 38, 42. Because the rods 14 and 12 follow paths which approach a parallel relationship, the distance between corresponding transverse points on the rods 12, 14 never become greater than it is at the beginning plane of the guide framework 10. Consequently, there is no opportunity for the can 38 to fall outside of the guide framework 10. Moreover, if a can of a different size should be placed on the conveyor belt 43, its attitude will be re-oriented by the guide framework 10 so long as the bottom surface of the disproportionate article is at least equal in width to the distance from the rod 12 in the beginning plane to the post 32 or, that is, to the side of the guide framework 10. Additionally, the height of the can 38 can vary substantially, so long as the top surface or lid 41 will fit within the guide rod 18. The guide rod 18 does not bear load at any time during the article re-orientation through the guide framework 10. The rods 12, 14 and 20 are the only rods which in normal usage will bear any of the load of the article. Thus, guide rod 18 may be substantially modified without impairing the operation of the guide framework 10. Indeed, the guide rod 18 may be eliminated altogether, as will be discussed in detail below with an alternative embodiment.

Another important advantage obtained by the guide framework of the present invention is its ability to accommodate articles such as cans 38, 42 which have fallen or by some other disturbance become oriented on their sides along the conveyor belt 43 prior to being processed through the guide framework 10. In such a circumstance, it has been found that the cans will not be re-oriented so that they will come out of the exit frame 36 in an upright, vertical attitude. Instead, the can 38 entering the guide framework 10 in a horizontal attitude, will exit through the exit frame 36 likewise in the desired horizontal attitude as indicated by can 44 in FIG. 1. It is believed that such a can in a horizontal attitude while on the conveyor belt 43 enters through the entering plane between the posts 32, 34 by virtue of movement along the conveyor belt 43. Succeeding cans such as can 42 urge the disoriented can 38 forward through the guide framework 10. The cylindrical side wall 40 is engaged initially by rod 12 and by rod 14. By the force of movement in the forward direction indicated by the arrow 21, the cylindrical side wall 40 is forced over the rod 20. The force of the rod 20 orients the can 38 so that the bottom 39 will contact on the rod 12, it is believed. Subsequently, the can follows through in the guide framework 10 in the usual, predicted pattern until it exits through exit frame 36. The can 38, furthermore, is prevented from re-orienting in an upside down vertical attitude by the presence of rod 16. Thus, while the cylindrical side wall 40 is momentarily riding upwardly on rod 12, it comes into engagement with rod 16. The rod 16 may assist the upper portion of can 38 over the rod 20. Alternatively, the rod 16 could urge the lower portion of can 38 laterally to the right, in the view of FIGS. 2 and 3, so that the bottom 39 will slide into a proper seating engagement with rod 12.

Figure 5:
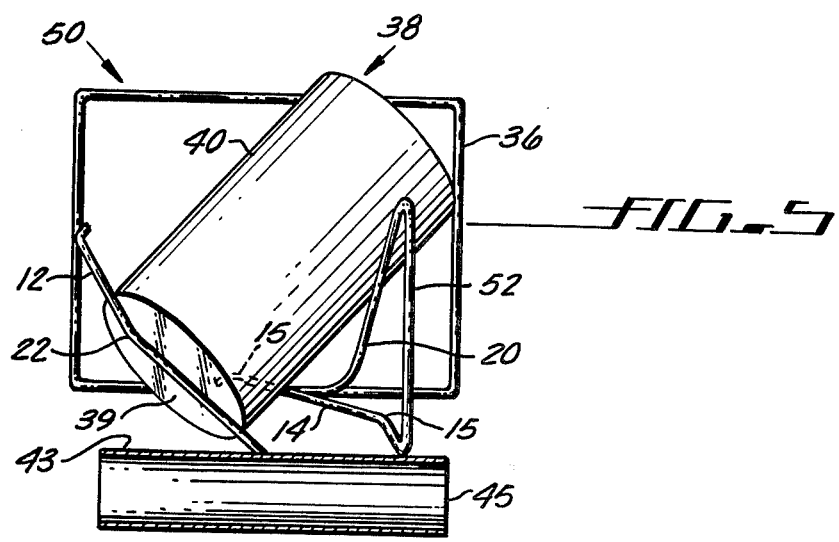
FIG. 5 is a side elevation view of an alternative embodiment of the invention as seen in the direction of article travel on the conveyor line; and, FIG. 6 is a side elevational view of another alternative embodiment of the invention, as seen in the direction of article travel on the conveyor line.

In FIG. 5 is shown an alternative embodiment of the present invention. The embodiment seen in FIG. 5 in many respects is similar to the preferred embodiment described above. A conveyor belt 43 conveys cans, such as can 38 into the guide framework 50. Guide rod 12 extends from the conveyor line plane embodying conveyor belt 43, to a side of exit frame 36 at a point elevated above the conveyor line plane. Guide rod 12 has a bend 22 positioned approximately mid-way along its length, within the guide framework 50. Additionally, guide rod 14 begins at one side of the guide framework 50 in the conveyor line plane, to the base of the exit frame 36. Bends 15 are made in guide rod 14 so as to present an elevated knee adapted to engage the can 38 along the cylindrical side wall 40 at a point below the center of gravity of the container 38.

Guide rod 20 extends from post 52 at the beginning plane of the guide framework 50, to the base of exit frame 36. Post 52 extends vertically only so far as to provide an elevated start for the guide rod 20. It may be noted that in the alternative embodiment of FIG. 5, guide rods 16 and 18 have been removed. Yet it may be appreciated that the can 38 being delivered into the guide framework 50 will be re-oriented from a vertical attitude to a horizontal attitude, with minimum risk of the can becoming dislodged from the conveyor line. Such action is possible primarily because the guide rods 16 and 18 are not designed to bear the load of the can 38 during its re-orientation within the framework 50.

The more simplified arrangement of guide framework 50 affords even greater tolerance for varying sized articles being re-oriented, such as cans. Moreover, the ability of the guide framework 50 to accommodate disoriented articles coming along the conveyor belt 43 remains. Frequently the can which has been disoriented in a horizontal attitude on the conveyor belt 43 is engaged by guide rods 12 and 14 in the guide framework 50. The can is then urged through the guide framework 50 by the continual stream of cans immediately behind it. In such a manner, the cylindrical side wall 40 rolls upon guide rods 12 and 14 until such time as it progresses so that the cylindrical side wall 40 can roll on top of guide rod 20. At this time, the bottom 39 falls to the inside of guide rod 12, usually after the bend 22. The can 38 then exits through frame 36 in the desired horizontal attitude. The can is not re-oriented into an upside down vertical attitude, as has been experienced in the past with prior art arrangements.

In yet another alternative embodiment of the invention, it has been found that guide rod 20 also can be eliminated. It is only required that a guide rod, similar to guide rod 14 in the embodiments of FIGS. 1-5 be provided which affords a slightly higher knee. Such a second alternative embodiment is shown in the elevational view of FIG. 6. Can 38 is fed in a continuous stream of cans born by conveyor belt 43. Guide rod 12 extends from a point approximately mid-way the width of the conveyor belt from the conveyor belt to exit frame 62 at a point elevated above the plane in which the conveyor line and conveyor belt 43 lie. Bottom 39 rides along guide rod 12 while the cylindrical side wall 40 is engaged by guide rod 64. Guide rod 64 has bends 66 which afford a substantially more elevated guide rod than the guide rod 14 found in the embodiments of FIGS. 1-5 above.

Initially, guide rod 64 engages the lower portion of cylindrical wall 40 while bottom 39 rides along the top of guide rod 12. At that point where guide rod 64 assumes a substantial load bearing function, the guide rod 64 must be at at least an elevation approximately at the center of gravity or slightly above the center of gravity to prevent the can 38 from tilting over the guide rod 64. As the can 38 continues to progress within the guide framework 60, the vertical attitude of the can 38 is progressively re-oriented into an horizontal attitude for exit through the frame 62.

Figure 6:
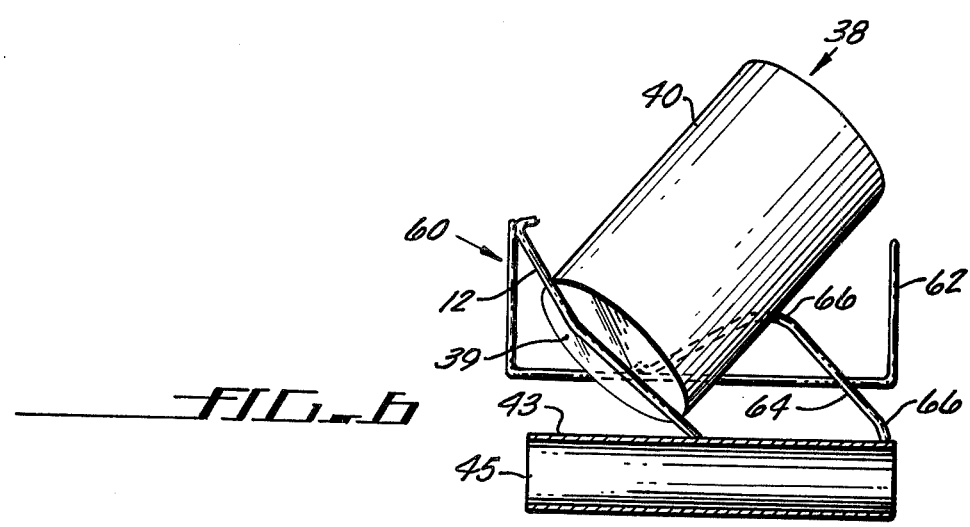

It may be appreciated that the embodiment shown in FIG. 6 of the drawings requires a more careful positioning of the guide rods 12, 64. Moreover, the guide framework 60 has a lower tolerance of varying sized articles or cans than do the guide frameworks 10, 50. Nonetheless, the guide framework 60 does have the ability to accommodate disoriented cans in the horizontal attitude on conveyor belt 43, having them exit the framework in the desired horizontal attitude.

It may be noted that in the embodiment of FIG. 6, there is no upper or top portion of the exit frame 62. Likewise, the upper portion of the exit frame 36 in the embodiment shown in FIG. 5 may be eliminated. The exit frame 36 will continue to serve all desired functions, since there is no guide rod attached to the upper portion of it.

Although there have been described above several specific arrangements of an article re-orienting guide framework or channel in accordance with the invention for the purpose of illustrating the manner in which the invention may be used to advantage, it is to be appreciated that the invention is not limited thereto. Accordingly, any and all modifications, variations or equivalent arrangements which may occur to those skilled in the art should be considered within the scope of the invention as defined in the appended claims.

What is claimed is:

1. Article handling apparatus for rotating a procession of cans, each having at least one side wall and a bottom surface meeting at a sharp intersection, in a can conveyor line from a vertical to a horizontal attitude during traversal of the cans from the inlet end to the outlet end of the apparatus, the apparatus comprising:

a guide framework having a plurality of rods extending between an entrance portion with a bottom and opposed sides and an exit frame having a bottom, top and opposed sides;

a first rod of said plurality extending from the bottom of the entrance portion to a first side of the exit frame for elevating the bottom surfaces of the cans riding thereon;

a second rod of said plurality extending from a second side of the entrance portion to the bottom of the exit frame and having an elevated section between the ends of the second rod, the second rod being adapted to engage the at least one side wall at a point above the bottom surface but below the can center of gravity;

a third rod of said plurality extending from the entrance portion to the exit frame in the direction between the first and second rods and having a section positioned to engage the portion of the can below the center of gravity thereof for directing the lower portion of the can to ride along the first rod and for tilting the can so that the upper portion rides along the second rod; and a fourth rod positioned to restrain the can on the at least one side wall opposite the second rod for tilting the can toward the second rod.

2. The article handling apparatus of claim 1 wherein the fourth rod extends from a first side of the entrance portion to the top of the exit frame in a direction toward the second side of the exit frame for engaging the can above the center of gravity and tilting it toward the second rod.

3. Article handling apparatus for rotating a procession of cans, each having at least one side wall and a bottom surface, in a can conveyor line from a vertical to a horizontal attitude during traversal of the cans from the inlet end to the outlet end of the apparatus, the apparatus comprising:

a guide framework having a plurality of rods extending between an entrance portion with a bottom and opposed sides and an exit frame having a bottom, top and opposed sides;

a first rod of said plurality extending from the bottom of the entrance portion to a first side of the exit frame for elevating the bottom surfaces of the cans riding thereon;

a second rod of said plurality extending from a second side of the entrance portion to the bottom of the exit frame and having an elevated section between the ends of the second rod for engaging the can above the can center of gravity;

a third rod of said plurality extending from the entrance portion to the exit frame in the direction between the first and second rods and having a section positioned to engage the portion of the can below the center of gravity thereof for directing the lower portion of the can to ride along the first rod and for tilting the can so that the upper portion rides along the second rod; and a fourth rod of said plurality adapted to engage the can above the can center of gravity on the side remote from the second rod for tilting the can toward the second rod.

4. Article handling apparatus for rotating a procession of cans, each having at least one side wall and a bottom surface, in a can conveyor line from a vertical to a horizontal attitude during traversal of the cans from the inlet end to the outlet end of the apparatus, the apparatus comprising:

a guide framework having a plurality of rods extending between an entrance portion with a bottom and opposed sides and an exit frame having a bottom, top and opposed sides;

a first rod of said plurality extending from the bottom of the entrance portion to a first side of the exit frame for elevating the bottom surfaces of the cans riding thereon;

a second rod of said plurality extending from a second side of the entrance portion to the bottom of the exit frame and having an elevated section between the ends of the second rod for engaging the at least one side wall of the can above the can center of gravity, said second rod including two relatively straight portions joined at a distinct bend approximately mid-way of the second rod; and a third rod of said plurality extending from the entrance portion to the exit frame in the direction between the first and second rods and having a section positioned to engage the portion of the can below the center of gravity thereof for directing the lower portion of the can to ride along the first rod and for tilting the can so that the upper portion rides along the second rod, said third rod further including a pair of distinct bends at opposite ends of said section for engaging the lower portion of the can, said bends serving to raise said section to a position to engage the can below the center of gravity but above the bottom surface.

5. The article handling apparatus of claim 4 wherein the first rod also includes two relatively straight portions joined at a distinct bend located approximately mid-way along its length but displaced slightly in the longitudinal direction from the bend in the second rod.

6. The article handling apparatus of claim 5 wherein both of the bends of the third rod are displaced longitudinally along the rod from the longitudinal positions of the bends in the first and second rods.

7. The article handling apparatus of claim 4 wherein the bends in the third rod position a knee portion between said bends for engaging the lower portion of a can for tilting thereof from the vertical to a horizontal position.

* * * * *